United States Patent [19]

Goodwin

[11] Patent Number: 5,564,586

[45] Date of Patent: Oct. 15, 1996

[54] MOLDED BIN COVER, HINGE AND METHOD

[75] Inventor: Elmer C. Goodwin, deceased, late of Greenville, S.C., by Glenn R. Goodwin, legal representative

[73] Assignee: Continental Southern Industries, Inc., Greenville, S.C.

[21] Appl. No.: 287,515

[22] Filed: Aug. 8, 1994

[51] Int. Cl.[6] ............................ B65D 43/16; B65D 21/00; B65F 1/16

[52] U.S. Cl. ........................ 220/343; 220/908; 206/515; 16/DIG. 13

[58] Field of Search .................................... 296/100, 101, 296/191, 901; 220/908, 909, 334, 337, 342, 343, 4.33, 4.34; 16/DIG. 13, 273, 225; 206/515, 518, 821

[56] References Cited

U.S. PATENT DOCUMENTS

| | | | |
|---|---|---|---|
| 4,445,623 | 5/1984 | Kolling et al. | 220/908 X |
| 4,450,976 | 5/1984 | Snyder et al. | 220/908 X |
| 4,558,799 | 12/1985 | Hammond | 220/343 |
| 4,949,866 | 8/1990 | Sanders | 220/908 X |
| 4,964,193 | 10/1990 | Rommelfaenger et al. | 16/225 |
| 5,088,616 | 2/1992 | Susko et al. | 220/909 X |
| 5,248,057 | 9/1993 | Taylor | 220/908 X |
| 5,423,448 | 6/1995 | Pedigo | 220/908 X |

*Primary Examiner*—Allan N. Shoap
*Assistant Examiner*—Nathan Newhouse
*Attorney, Agent, or Firm*—Ralph Bailey

[57] ABSTRACT

A plastic bin cover for a refuse bin has integrally molded spaced upper and lower cover sheets having upwardly projecting ribs (A) and (B) respectively, the ribs (A) being receivable in ribs (B) of respective plastic bin covers when in stacked, nested relation for shipping or storage. Hinge members integrally formed by blow molding of the bin cover include knuckles (C) forming transverse plastic tubes (D) for receiving a hinge pin.

7 Claims, 4 Drawing Sheets

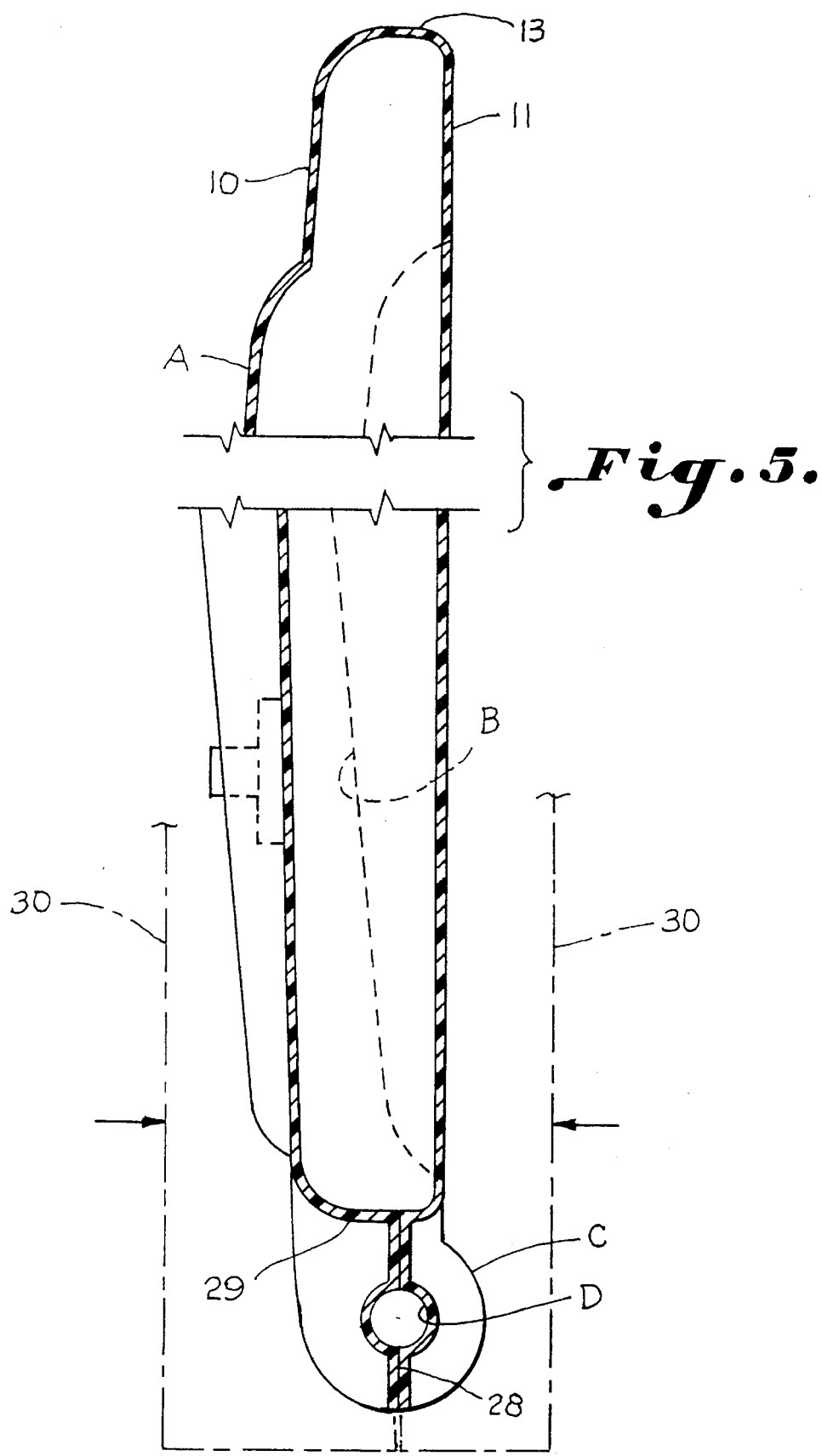

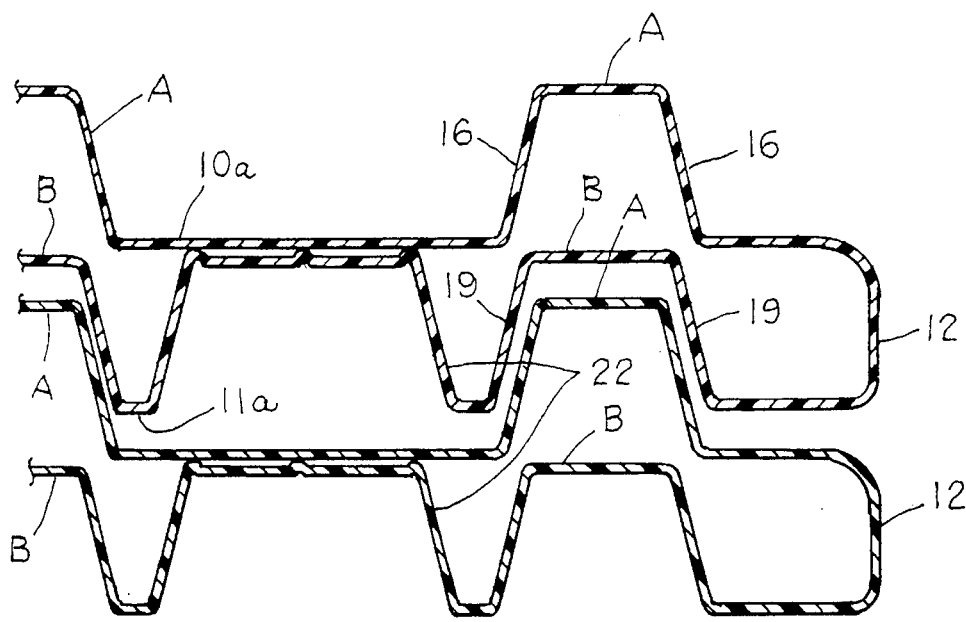
Fig. 7.
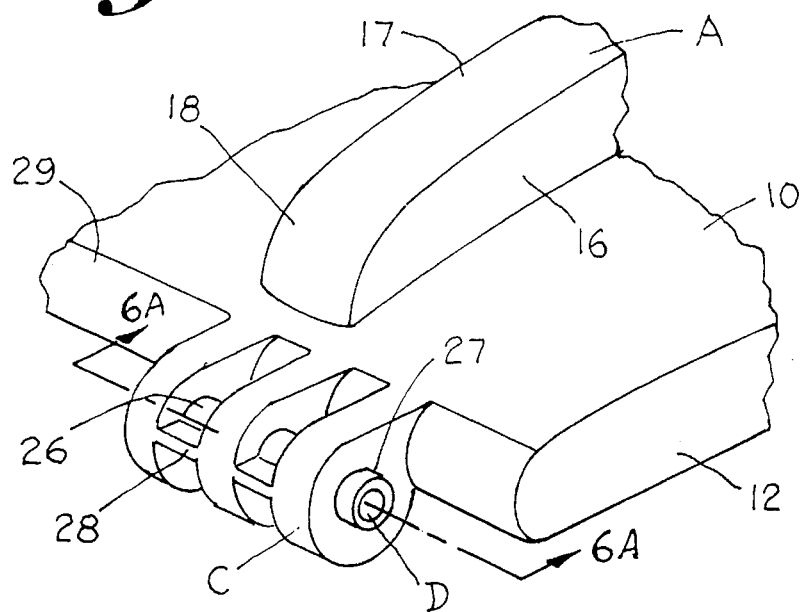
Fig. 6.
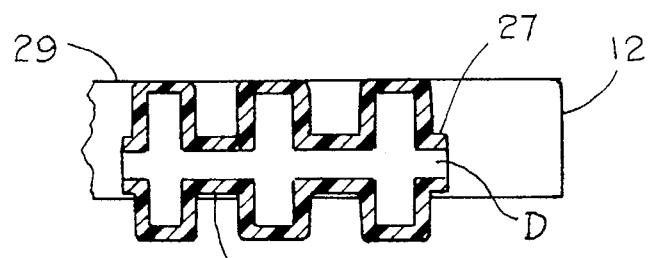
Fig. 6-A.

MOLDED BIN COVER, HINGE AND METHOD

BACKGROUND OF THE INVENTION

This invention relates to an improved plastic cover and to an improved method wherein molded hinge constructions as well as the provision of novel reinforcing ribs are facilitated during molding.

Refuse bin covers are often constructed by rotational molding utilizing cross-linked polyethylene. Such constructions often incorporate hinges which either require the insertion of metal tubes into the plastic hinge members or alternate upper and lower receiving openings for the metal hinge rods. While the metal tubes provide a positive and accurately aligned I.D., they are expensive requiring an additional manufacturing step. The alternate openings approach is less effective in that the hinges often spring out of engagement with the hinge rods. Since the hinge members are normally limited to the two thicknesses which forming upper and lower covers, breakage often occurs in these areas of maximum stress. Refuse bins constructed in accordance with U.S. Pat. No. 4,771,940 are representative of the prior art. While the patent contemplates limited nesting is provided to conserve space when stacking, the fact that respective upper and lower ribs of respective covers run in opposite directions precludes effective space conservation.

SUMMARY OF THE INVENTION

Accordingly, it is an important object of this invention to provide a hinge member during the molding process. The knuckle hinge member of the invention provides maximum hinge strength and eliminates the necessity for a steel tube insert normally required to provide a tubular receptacle for non binding reception of a hinge pin thereby allowing for reduced labor and material costs.

A further object of the invention is to provide a nesting feature facilitating shipping and which requires less storage space for the customer. A very important feature of the invention is the added strength of the lid provided by a rib area on the underside of the lid which is designed to follow the contours of the ribs on the top side of the lid for permitting nesting and stacking of a number of lids constructed in accordance with the invention.

Another feature of the improved lid is the extension of the ribs to each hinge thus adding strength in the hinge area which normally is the weakest part of the lid.

The improved lid may be manufactured by the rotational process, the twin sheet vacuum process or by blow molding. Significant advantages may be achieved by utilizing the blow molding process which allows for the use of a wide variety of materials and facilitates manufacture of the knuckle hinge configuration. Thus, the improved lid construction and method provides a cost advantage in the manufacturing process and in reduced freight as a result of the nesting feature and at the same time provide a superior lid.

While the knuckle is described as being molded integrally with a bin cover, the hinges may be advantageously used in other structures wherein the hinges are a part of the construction.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is a longitudinal sectional elevation illustrating a blow molded method of manufacturing wherein opposed molded parts are pushed together to form the bin cover including the knuckle shaped hinged member with tubular passageway for receiving metal hinge rods;

FIG. 6 is an enlarged perspective view looking toward the left rear of the bin cover illustrating a hinge with internal tubular members;

FIG. 6A is a transverse sectional elevation taken on the line 6A—6A in FIG. 6; and FIG. 7 is a transverse sectional elevation illustrating a pair of molded bin covers constructed in accordance with the present invention in stacked superposed nested relation.

DESCRIPTION OF A PREFERRED EMBODIMENT

The drawings illustrate a plastic cover for a refuse bin having a molded upper cover sheet and a lower cover sheet integrally molded with the upper cover sheet. First upwardly projecting ribs A extend longitudinally across the plastic cover in transversely spaced parallel relation to each other in the upper cover sheet. Second upwardly projecting ribs B extend longitudinally across the plastic cover in the lower cover sheet in transversely spaced parallel relation to each other and in superposed relation to the first upwardly extending ribs and being complementary thereto so as to nest therein. Intermediate members bridge the first upwardly projecting ribs and the second upwardly projecting ribs in the upper and lower cover sheets respectively. The first ribs A are receivable in second ribs B of a plastic cover stacked thereon. Thus, a number of the plastic covers may be stacked for shipping in closely nesting relation with the first ribs being received within the second ribs of superposed stacked plastic covers.

A plastic cover constructed in accordance with the invention preferably includes a hinge member for receiving a transverse hinge pin carried by a trash bin for pivotal securement of a rear end of the plastic cover thereto. A hinge member includes a plurality of arcuate integrally molded knuckles C, a plurality of arcuate intermediate members between the knuckles molded integrally therewith, and a transverse plastic tube D defined in the knuckles and in the intermediate members for receiving a hinge pin. Interconnecting members join the knuckles to the upper and lower cover sheets and are molded integrally therewith. Thus, a strengthened hinge member is provided which is constructed entirely of plastic molded integrally with the upper and lower cover sheets.

Figure 1:
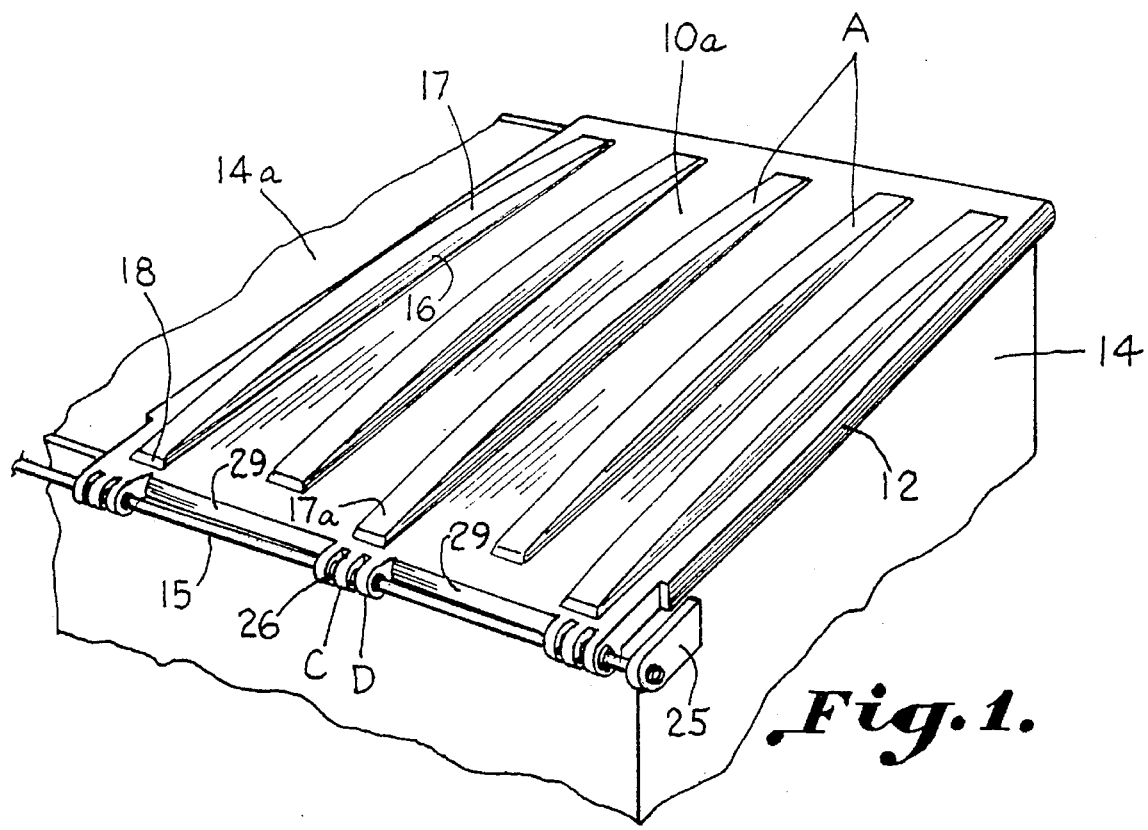
FIG. 1 is a perspective view illustrating a molded cover constructed in accordance with the present invention attached to a refuse container.

The molded plastic cover includes a molded upper cover sheet 10 and a molded lower cover sheet 11 spaced thereebeneath and integrally molded and joined thereabout by sides 12 and a front end member 13. The plastic cover is illustrated in FIG. 1 as being positioned on a refuse bin or container 14. The plastic cover is pivotally mounted upon a hinge rod 15 which may or may not carry springs for aiding in maintaining the cover in open or closed position. The upper cover sheet 10 carries first upwardly projecting ribs A which extend longitudinally across the plastic cover in transversely spaced parallel relation to each other. The ribs include upwardly projecting sides 16 which converge inwardly and upwardly toward an upper surface 17. It will be observed that the ribs A are also bowed from reduced end portions 18 upwardly toward a central portion which is of maximum height in order to effectively and rigidly reinforce the molded cover.

Figure 2:
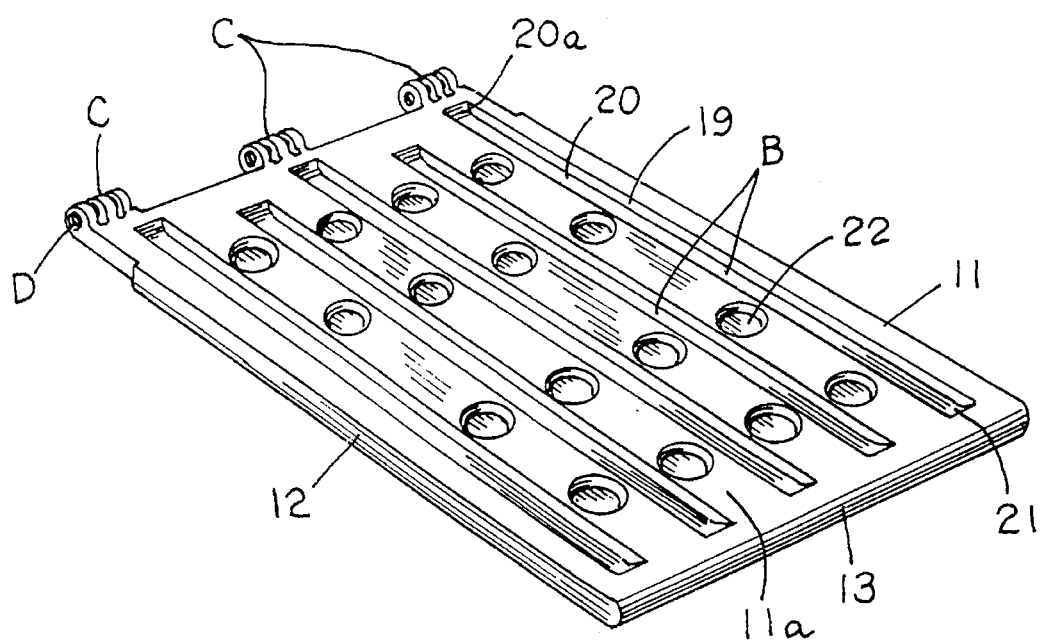
FIG. 2 is a perspective view looking toward the underside of the front left end of the molder bin cover.
Figure 3:
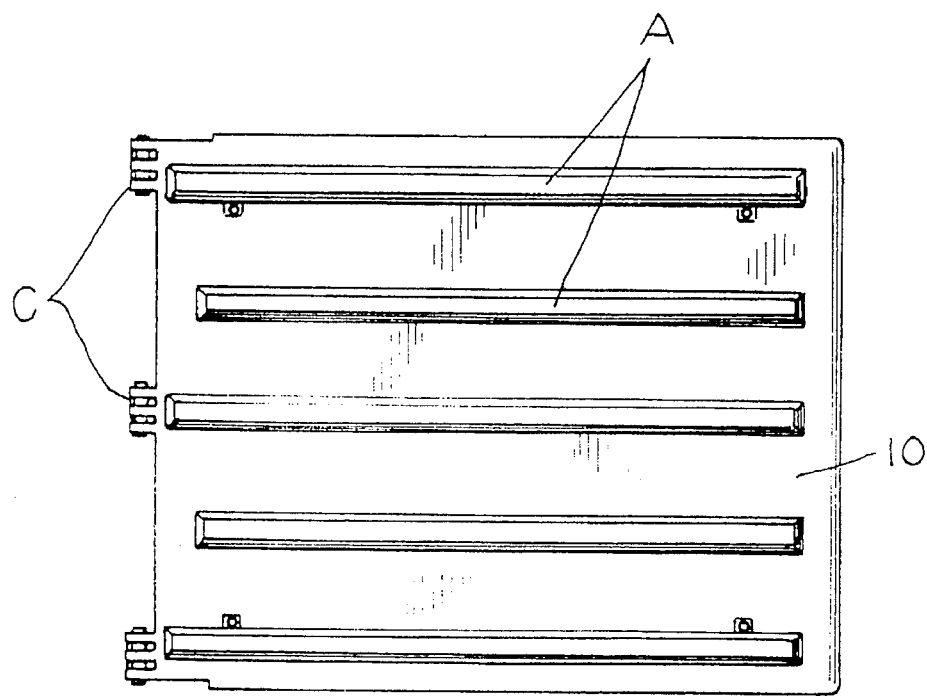
FIG. 3 is a top plan view illustrating the molded bin cover.
Figure 4:
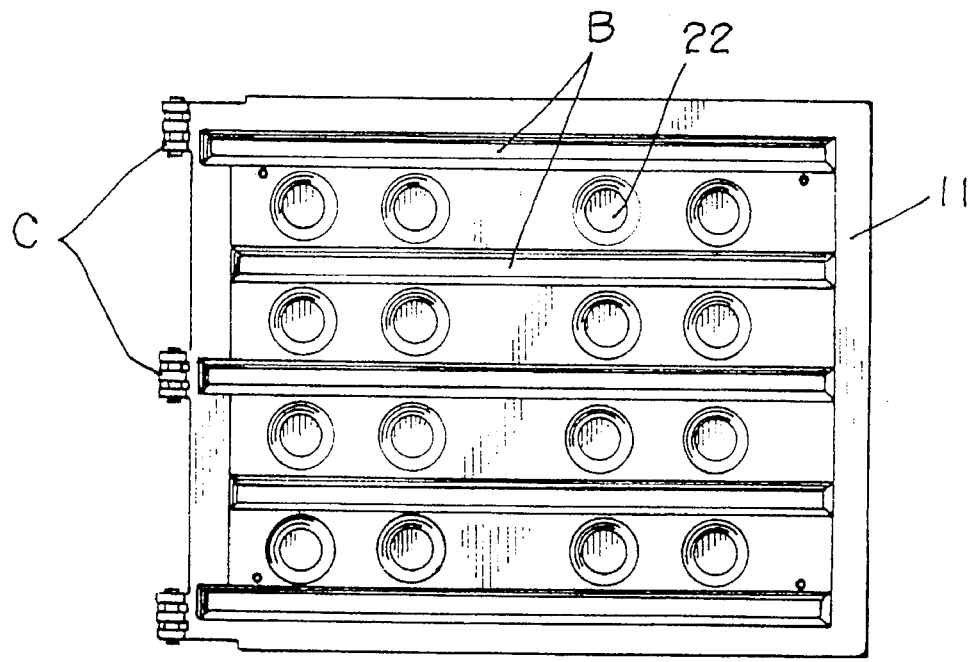
FIG. 4 is a bottom plan view further illustrating the molded bin cover.

It will also be observed that second upwardly projecting reinforcing ribs B extend longitudinally across the plastic cover in the lower cover sheet 11 in transversely spaced parallel relation to each other and in superposed relation to the first upwardly extending ribs and being complementary thereto so as to be received within them. Referring more particularly to FIG. 2, it will be observed that the upwardly extending ribs B include upwardly converging sides 19 extending toward an upper surface 20. The upper surface 20 is bowed upwardly from end members 21 toward a central portion of maximum height so as to nest easily within a plastic cover sheet which is carried in stacked relation thereto as illustrated in FIG. 7. A number of reinforcing cups 22 may be utilized in intermediate members 11a which bridge the upwardly projecting ribs B. These cups 22 extend upwardly into bearing relation with bridging members 10a as shown in FIG. 7 which extend between the upwardly projecting ribs A.

The plastic cover also includes hinge members for receiving the transverse hinge pin 15. The hinge pin 15 is carried in fixed relation upon the refuse container 14 as by brackets 25, FIG. 1. As further illustrated in FIG. 1, a number of covers may be carried upon the rod 15 to close the open top 14a of the refuse container. The hinge members each include a plurality of arcuate integrally molded knuckles C. It will be observed in FIG. 1 that each of the hinge members are illustrated as including several knuckle portions although any desired number may be utilized. The hinge members are spaced transversely along the back of the plastic cover for reception upon the metal hinge rod 15. The hinge member further includes a number of arcuate concave intermediate members 26 between the convex molded knuckles C. It will be observed that a transverse plastic tube D is defined in the knuckle and in the intermediate members for reception upon the hinge pin 15. The knuckles are hollow, but the tube D is defined at marginal portions thereof and intermediate the knuckles as shown in FIG. 6A. A boss 27 is shown in FIG. 6 for extending the tubular portion D and provides a greater surface area for reception of the hinge pin 15. It will also be observed that a web portion 28 may extend between the knuckles as shown in FIG. 6 for further reinforcing the hinge areas.

In this regard, it will be noted that the ribs A and B in the areas opposite the hinges are extended as at 17a and 20a respectively so as to provide further reinforcing in this area of maximum stress to the cover. Rear end sections 29 of the cover are spaced between the respective hinge members C. It is important to note that the hinge members project rearwardly beyond the sections 29 and are connected to upper and lower cover sheets 10 and 11.

Referring especially to FIG. 5, it will be noted that a depending parison has been blown and that mold parts 30 are moved inwardly from each side in the direction of the arrows so as to form the various components of the molded cover and to pinch off a lower end of the parison to form the hinge members including the knuckles C while the internal tubular members D are formed as a result of continuing to blow air into the parison to thus form integral aligned tubes of uniform ID as shown in FIG. 6A. By speeding up or slowing down the movement of the parison by appropriate means such as varying the size of the orifice, thickness of the components may be controlled as preferably in a computer controlled sequence. For example, the area adjacent the hinge member C may be thickened so as to provide further reinforcement as may be noted by comparing the greater wall thickness of the hinge of FIG. 6A to the lesser wall thickness of FIG. 7.

It is thus seen that substantial labor savings occur during the molding process while a uniform and aligned hinge ID is provided for the hinge rod. Substantial economies are made possible both in shipping and in storage as a result of the nesting of the longitudinal reinforcing ribs. By utilizing high molecular weight high density polyethylene which may be advantageously used in blow molding, it is possible to recycle the thus reinforced and readily molded plastic cover member.

While a preferred embodiment of the invention has been described using specific terms, such description is for illustrative purposes only, and it is to be understood that changes and variations may be made without departing from the spirit or scope of the following claims.

What is claimed is:

1. A plastic cover for a refuse bin having a molded upper cover sheet and a lower cover sheet spaced therebeneath integrally molded with said upper cover sheet and joined about marginal portions thereof comprising:

first upwardly projecting ribs extending longitudinally across said plastic cover in transversely spaced parallel relation to each other in said upper cover sheet;

second upwardly projecting ribs extending longitudinally across said plastic cover in said lower cover sheet in transversely spaced parallel relation to each other and in superposed relation to said first upwardly projecting ribs and being complementary and corresponding thereto so as to be received therein;

intermediate members bridging said first upwardly projecting ribs and said second upwardly projecting ribs in said upper and lower cover sheets respectively;

said first and second ribs tapering upwardly so that said first upwardly projecting ribs are receivable in said second upwardly projecting ribs; and said second upwardly projecting ribs being open and aligned for reception of said first upwardly projecting ribs when in superposed relation thereto;

whereby a number of said plastic covers may be stacked for shipping in closely nesting relation with said first ribs of one said plastic cover being received within said second ribs of another said plastic cover in superposed relation thereto.

2. The structure set forth in claim 1 wherein said plastic cover is constructed of high molecular weight polyethylene by blow molding.

3. The structure set forth in claim 1 including a plurality of transversely spaced hinge members extending longitudinally at an end of said cover member and formed by said upper cover sheet and said lower cover sheet integrally therewith wherein tubular portions are formed in each hinge member in alignment for receiving a hinge pin.

4. The structure set forth in claim 3 wherein said ribs are extended to said hinge members for reinforcement.

5. A plastic cover member comprising:

a molded upper cover sheet;

a lower cover sheet spaced therebeneath integrally molded with said upper cover sheet;

marginal walls integrally joining said upper and lower cover sheets;

a hinge member molded from said upper and lower cover sheets adjacent an end of said cover member;

said hinge member including:

- a plurality of transversely spaced knuckle members extending longitudinally between said upper cover sheet and said lower cover sheet molded integrally therewith;
- a transverse tubular portion extending between said transversely spaced knuckle members molded integrally therewith defining a cylindrical surface area for receiving a pin therein; and
- said knuckle members and said tubular portion being pivotable as a unit with said tubular portion engaging said pin for pivotal movement thereabout;

whereby said plastic cover member may be hinged upon a pin carried in transverse relation thereto.

6. The structure set forth in claim 5 wherein each hinge member has a plurality of said knuckle members each integrally joined by a tubular portion.

7. The structure set forth in claim 6 wherein a plurality of said hinge members are spaced transversely of said cover members and extend outwardly therefrom.

* * * * *